Jan. 31, 1961

R. E. RAYMOND 2,969,647

SYNCHRONIZING SYSTEM

Filed July 16, 1958

Inventor
Robert E. Raymond
By Schroeder, Hofgren, Brady & Wegner
Attorneys

United States Patent Office 2,969,647
Patented Jan. 31, 1961

2,969,647

SYNCHRONIZING SYSTEM

Robert E. Raymond, Zanesville, Ohio, assignor to Racine Hydraulics and Machinery, Inc., a corporation of Wisconsin Filed July 16, 1958, Ser. No. 748,911

6 Claims. (Cl. 60—97)

This invention relates to a synchronizing system for motors and more particularly to a system for synchronizing the position and movement of a plurality of hydraulic cylinders.

An object of this invention is to provide a new and improved synchronizing system in which the instantaneous positions of a plurality of motors are synchronized.

Another object of this invention is to provide a system for synchronizing the movement of a pair of hydraulic cylinders in which a pair of displacement to pressure transducers are connected one to each of the output sides of said cylinders and means are provided for comparing the pressure signals from the transducers for controlling the rate of fluid flow to one of said cylinders to synchronize the cylinders.

Another object of the invention is to provide a synchronizing system as defined in the preceding paragraph wherein a flow restricting orifice is connected in series with each of said transducers to provide a velocity control for the cylinders and an orifice pressure drop feedback difference to control hunting of the system.

Another object of the invention is to provide a cylinder synchronizing system for a master cylinder and a slave cylinder connectable with a source of fluid under pressure including, a control valve in circuit with the slave cylinder to control the flow of fluid from the source to the slave cylinder, a pair of accumulators associated one with each of said cylinders to create a pressure signal corresponding to the position of the associated cylinder piston, and means for applying said pressure signals in opposed relation to the control valve whereby the rate of fluid flow to the slave cylinder is determined by the comparison of said pressure signals.

Still another object of the invention is to provide a system as defined in the preceding paragraph wherein a preamplifier valve is subjected to said pressure signals and is hydraulically connected to the control valve whereby a pressure signal provided by the preamplifier valve in its separate power circuit is utilized to position the control valve for controlling the slave cylinder.

Figure 1:
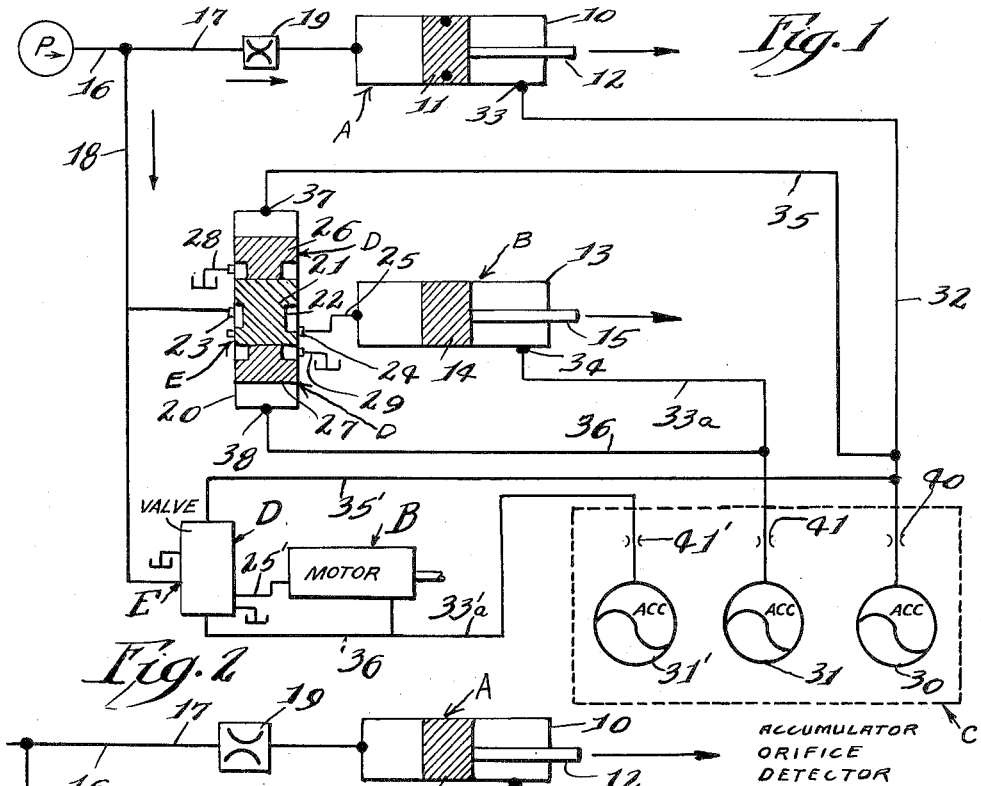
Figure 2:
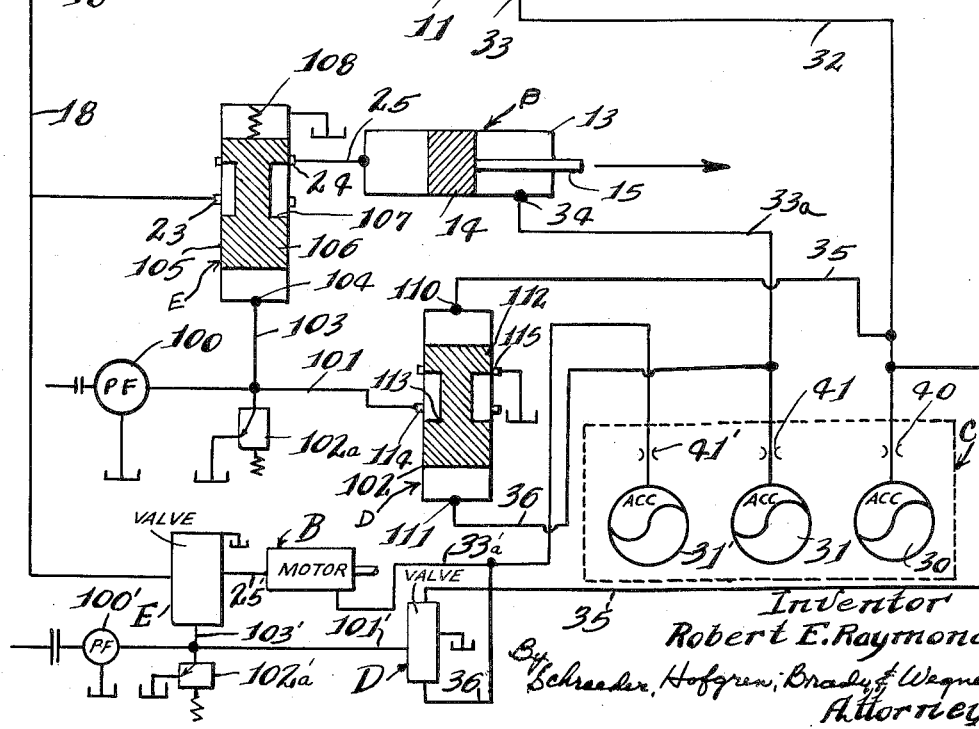

Further objects and advantages will become apparent from the following detailed description taken in connection with the accompanying drawings in which:

Fig. 1 is a diagrammatic view of a preferred embodiment of the cylinder synchronizing system; and Fig. 2 is a diagrammatic view of another embodiment of the cylinder synchronizing system.

While this invention is susceptible of embodiments in many different forms, there is shown in the drawings and will herein be described in detail a preferred embodiment of the invention and a modification thereof with the understanding that the present disclosure is to be considered as an exemplification of the principles of the invention and is not intended to limit the invention to the embodiment illustrated. The scope of the invention will be pointed out in the appended claims.

The invention broadly includes a master motor and one or more slave motors synchronized with the master motor.

In the systems disclosed in Figs. 1 and 2, a plurality of fluid motors, namely a master motor A and a pair of slave motors B are synchronized. This synchronization is accomplished by utilizing two distinct signals indicating the position and velocity of the motors as created by a signal creating mechanism, indicated generally at C. The signals are fed to a signal comparing means, indicated generally at D, and an imbalance in said signals results in shifting of a fluid flow governing device E for the slave motor B to bring the signals back into balance. As to each slave motor there is a component of the signal creating mechanism C, a signal comparing means D and a fluid flow governing device E, as shown in the drawings. These components are identical for each slave motor and only one set in each embodiment will be shown and described in detail. The same reference numerals are applied to corresponding structure for the slave motors B with a prime affixed thereto for the second set of structure.

In the embodiment of Fig. 1, the master fluid motor A comprises a master cylinder 10 having a piston 11 carrying a rod 12 with the piston and rod longitudinally movable within the cylinder. The slave fluid motor B comprises a slave cylinder 13 having a piston 14 with a rod 15 extending outwardly of the cylinder and the piston and rod are movable longitudinally within the cylinder. A line 16 is connectable to a source of hydraulic fluid under pressure and lines 17 and 18 extend from the line 16 with the line 17 leading to the master cylinder 10 and including means for controlling fluid flow to the master cylinder. This means in one embodiment is shown as a pressure compensated flow control valve 19 which may be of a commercially available type and is adjustable to vary the rate of flow and therefore to vary the velocity of the piston 11 in the cylinder 10.

The line 18 extends to the fluid flow governing device E comprising a flow control valve 20 for the slave cylinder 13. The control valve 20 has a balanced spool valve member 21 with a peripheral groove 22 which functions to selectively connect an inlet port 23 with an outlet port 24 whereby to control the flow of fluid from line 18 to a line 25 which is in fluid communication with the slave cylinder 13. The control valve 20 has the signal comparing means D comprising a pair of pilot sections 26 and 27 in abutting relation with opposite ends of the spool valve member 21 and each pilot section is exposed to fluid pressure as more fully described hereinafter. Each of the pilot sections 26 and 27 has a drain connection 28 and 29 respectively.

With the control valve 20 shown in the position of Fig. 1 a certain fluid flow is permitted to pass through the control valve to the slave cylinder 13. With upward movement of the valve member 21, as viewed in Fig. 1, this fluid flow path may be further reduced or cut off if the groove 22 rises to a level beyond the outlet port 24. Similarly, movement of the valve member 21 in the opposite direction will increase the flow to the slave cylinder 13. It will be seen that the position of the control valve member 21 controls the rate of movement of the slave cylinder 13 while the over all rate of movement of the cylinders is controlled by the flow control valve 19.

Means are provided for controlling the position of the fluid flow governing device E namely control valve 20 including the signal comparing means D previously described, and the signal creating mechanism C. This signal creating mechanism comprises displacement to pressure transducers with one associated with each motor and these transducers are preferably accumulators 30 and 31. The signal from the accumulator 30 and from each accumulator 31 individually are applied in opposition to each other to the comparing means D and an imbalance results in shift of the control valve 20 to change the flow to the slave motor B and synchronize the motors. The fluid displaced from the rod ends of the cylinders during the stroke produces a change in accumulator pressure proportional to piston displacement. The accumulator 30 is connected by a line 32 to an outlet port 33 on the discharge side of the master cylinder 10 while each accumulator 31 is connected by a line 33a to an outlet port 34 on the fluid discharge side of the slave cylinder 13. Each of the accumulators receive the fluid from their respective cylinders as it is discharged therefrom and the pressure will increase as the volume of stored fluid increases. The pressure signals from the accumulators are transmitted by lines 35 and 36 to opposite sides of the control valve member 21 and more particularly, to the pilot sections 26 and 27 respectively of the control valve through ports 37 and 38, respectively.

The pressures in accmullators 30 and 31 are transmitted to the control valve 20 and any difference therebetween will result in shifting of the control valve member 21 in a proper direction to bring the movement of the slave cylinder piston 14 and its position into correspondence with that of master cylinder piston 11. In order to prevent hunting and control the rate of response of slave cylinder 13, a flow restricting orifice 40 is placed in series with the accumulator 30 and a flow restricting orifice 41 is placed in series with the accumulator 31. The orifice 41 acts to control the velocity of piston 14 in the slave cylinder by the retarding pressure of the orifice and the velocity is also controlled by the orifice pressure drop feedback difference.

With the foregoing system the movement of a pair of hydraulic cylinders is synchronized and this synchronization includes detecting the instantaneous positions of the cylinder pistons.

A specific example of a suitable accumulator is that of the hydro-pneumatic type. The design of the master and slave cylinders should be substantially identical as should the design of the control orifices 40 and 41 and the accumulators 30 and 31. Also the power supply for the system should have a capacity in excess of that required for normal ram speeds to permit fast corrective movement. The mounting of the accumulators close together results in automatic temperature compensation of the accumulators.

In the embodiment of Fig. 2 the sensitivity and accuracy of the control is improved by using a low pressure auxiliary power supply 100 which is connected by an auxiliary line 101 to a preamplifier valve 102. The auxiliary line 101 has a relief valve 102a and connects to a branch line 103 connected to a port 104 at one end of a control valve 105. The control valve 105 has the inlet port 23 and the outlet port 24 and has a control valve member 106 slidably mounted therein provided with a peripheral groove 107 which may selectively place the ports 23 and 24 in fluid communication. The control valve member 105 is urged downwardly as viewed in Fig. 2 by a spring 108 in opposing relation to the pressure of fluid entering the lower end of the cylinder 105.

The pressure signal transmitting lines 35 and 36 extend to the preamplifier valve 102 with the line 35 connected to the valve by a port 110 and the line 36 connected to the valve by a port 111. The pressures of the respective lines are directed in opposed relation against a preamplifier valve member 112 whereby the preamplifier valve member 112 will assume a position corresponding to the difference in pressures in the accumulators 30 and 31. The preamplifier valve member 112 has a peripheral groove 113 which selectively connects a port 114 with an outlet port 115.

The inclusion of several slave motors in parallel with the master motor may be done with minimum error in the system when the preamplifier valve 102 is used with each slave motor. Without the preamplifier valve each control valve E for a slave motor, in the embodiment of Fig. 1, requires a volume of oil from the master motor accumulator which places a substantial fluid volume load on the master motor accumulator circuit. The preamplifier valve 102 merely functions to control the flow governing device E and does not have any direct relation to the operating fluid for the slave motor passing through control valve E. Because of this the preamplifier valve may be small and have small movements. The use of small valves with small movements maintains at a minimum the demand for fluid from the master motor accumulator to minimize error in the system when a plurality of slave motors are synchronized with the master motor.

In operation of this embodiment the pressure signals from the accumulators are applied to the preamplifier valve 102 which is caused to take a position controlling the rate of flow from the auxiliary low pressure power supply through the auxiliary line 101 which connects to the port 114. The pressure in auxiliary line 101 is transmitted through line 103 to the control valve member 106 to position the control valve member 106 and control the rate of flow to the slave cylinder 13 and cause piston 14 to have the same position as the master cylinder piston 11 and have the same rate of movement. More specifically, if slave cylinder piston 14 is lagging the pressure in accumulator 30 will be greater than that in accumulator 31 which will lower the preamplifier valve member 112, as viewed in Fig. 2, to reduce the flow through line 101 and increase the fluid pressure in line 101 whereby fluid pressure causes valve member 106 to rise against the action of spring 108 to increase the flow through the control valve to the slave cylinder 13.

Conversely, if the slave cylinder piston 14 precedes the master cylinder piston 11, the pressure in accumulator 31 will be greater than that in accumulator 30 and the operation will be the reverse of that described above.

It will be seen from the foregoing embodiments of the synchronizing system that the system embodies a pure hydraulic method for detecting the position of the cylinder pistons and that is the variable of first importance in obtaining accurate synchronization of cylinder movements.

I claim:

1. A system for synchronizing the movement of a pair of hydraulic cylinders comprising, a master cylinder and a slave cylinder both having a fluid inlet and a fluid outlet and both connectable in parallel with a source of hydraulic fluid under pressure, a control valve in circuit with the slave cylinder inlet responsive to opposed pressure signals to control the flow of said fluid from the source to said slave cylinder, a pair of fluid-storing accumulators in circuit one with each of said cylinder fluid outlets to receive hydraulic fluid discharged therefrom and create a pressure signal corresponding to the position of the associated cylinder piston, and means for applying said pressure signals in opposed relation to the control valve whereby the rate of fluid flow to the slave cylinder is determined by comparison of said pressure signals and adjusted to have the slave cylinder synchronized with the master cylinder.

2. A system as defined in claim 1 wherein a flow restricing orifice is located in each of the circuits in series with the accumulators to provide a velocity control for the cylinders and an orifice pressure drop feedback difference to control hunting of the system.

3. A system for synchronizing the movement of a pair of hydraulic cylinders comprising, a master cylinder and a slave cylinder connectable in parallel with a source of hydraulic fluid under pressure, a flow control valve in circuit with the master cylinder to determine the rate of movement of said master cylinder, a second control valve in circuit with the slave cylinder to control the flow of fluid from the source to said slave cylinder including a valve member and a pair of slidable pilot members engageable with opposite ends of said valve member, a pair of hydraulic fluid storing accumulators connected one with each of said cylinders to receive fluid discharged therefrom and create a pressure signal corresponding to the position of the associated cylinder piston, and means for applying said pressure signals to said pilot members in opposed relation relative to the valve member whereby the rate of fluid flow to the slave cylinder is determined by comparison of said pressure signals and controlled to maintain the slave cylinder synchronized with the master cylinder.

4. A fluid system for synchronizing the position of fluid motors including, a pair of fluid motors adapted to be connected in parallel to a source of fluid under pressure, a control valve between said source and one of the motors for controlling the flow of fluid to said one motor to control the position thereof, a pair of acumulators in circuit one with each of said motors to receive fluid discharged therefrom, and valve means for determining an imbalance of fluid pressures in said accumulator circuits to control the position of said control valve as a resultant thereof to balance said pressures whereby said one motor is synchronized with the other motor.

5. A system for synchronizing the movement of a pair of hydraulic cylinders comprising, a master cylinder and a slave cylinder connectable with a source of fluid under pressure, a control valve in circuit with the slave cylinder to control the flow of fluid from the source to said slave cylinder and positionable by an auxiliary pressure, a pair of accumulators connected one with each of said cylinders to create a fluid pressure signal corresponding to the position of the associated cylinder piston, a preamplifier valve connected to an auxiliary fluid power supply by an auxiliary line for controlling the flow of fluid in said line, a line connecting the control valve with said auxiliary line for subjecting said control valve to the auxiliary pressure in said auxiliary line, and means for applying said pressure signals to said preamplifier valve in opposed relation to control the fluid flow and pressure in said auxiliary line whereby the control valve is positioned by said auxiliary pressure to control fluid flow to the slave cylinder and synchronize the movement of said cylinders.

6. A fluid system as defined in claim 5 including a flow restricting orifice in series with each accumulator acting as a velocity damper to control the rate of response of said slave cylinder and prevent oscillation of the system.

References Cited in the file of this patent

UNITED STATES PATENTS

| | | |
|---|---|---|
| 1,961,350 | Grunsky | June 5, 1934 |
| 1,999,834 | Ernst | Apr. 30, 1935 |
| 2,060,433 | Van Cappellen | Nov. 10, 1936 |
| 2,521,053 | Ellis | Sept. 5, 1950 |
| 2,584,872 | Hart | Feb. 5, 1952 |
| 2,729,943 | Clark et al. | Jan. 10, 1956 |
| 2,742,763 | Cohen | Apr. 24, 1956 |

FOREIGN PATENTS

| | | |
|---|---|---|
| 131,348 | Great Britain | Aug. 28, 1919 |